July 19, 1955 — G. A. LYON — 2,713,517
WHEEL STRUCTURE AND METHOD OF MAKING SAME
Filed Nov. 18, 1952 — 3 Sheets-Sheet 1
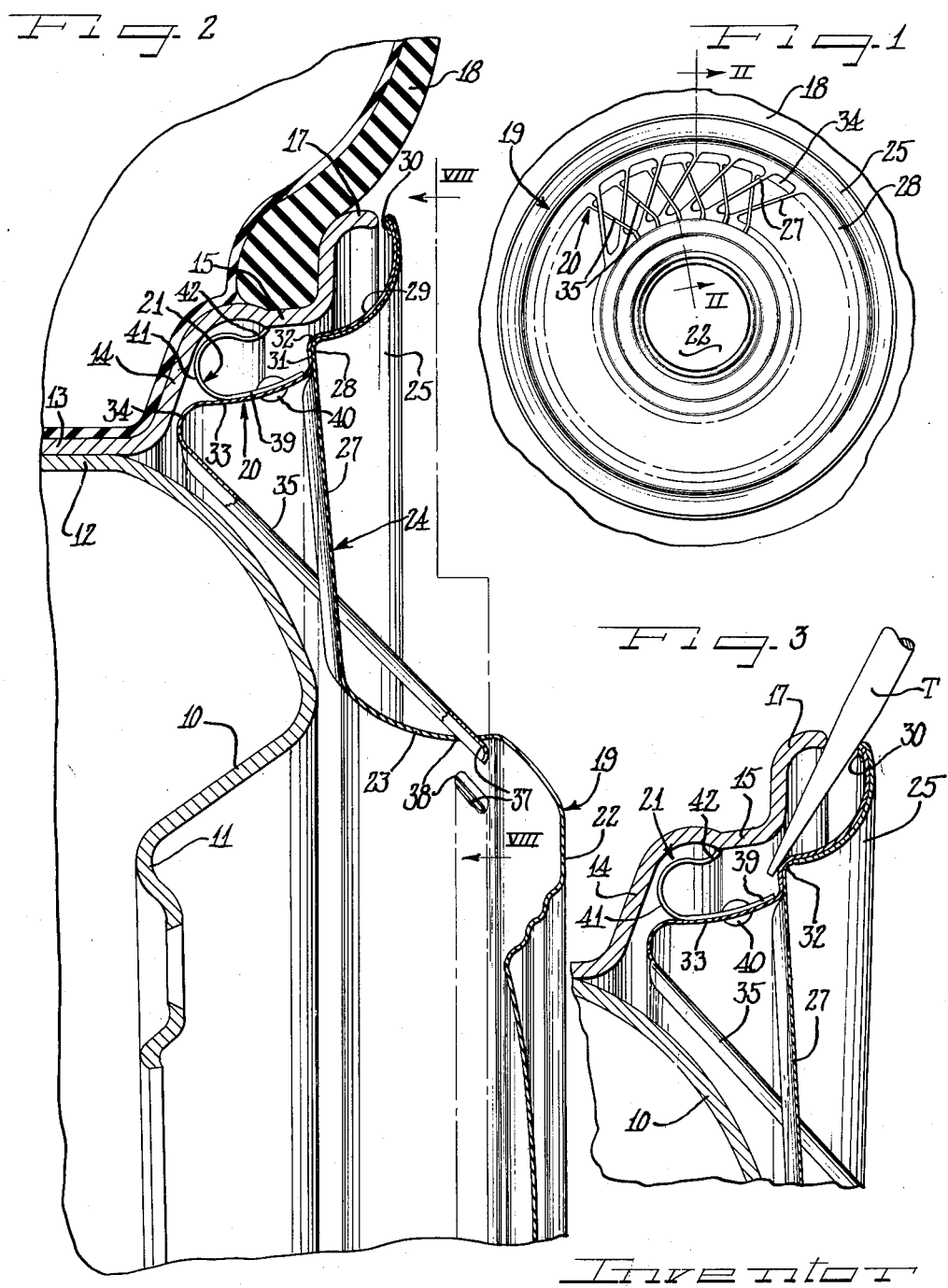
Inventor
George Albert Lyon July 19, 1955 G. A. LYON 2,713,517
WHEEL STRUCTURE AND METHOD OF MAKING SAME
Filed Nov. 18, 1952 3 Sheets-Sheet 2
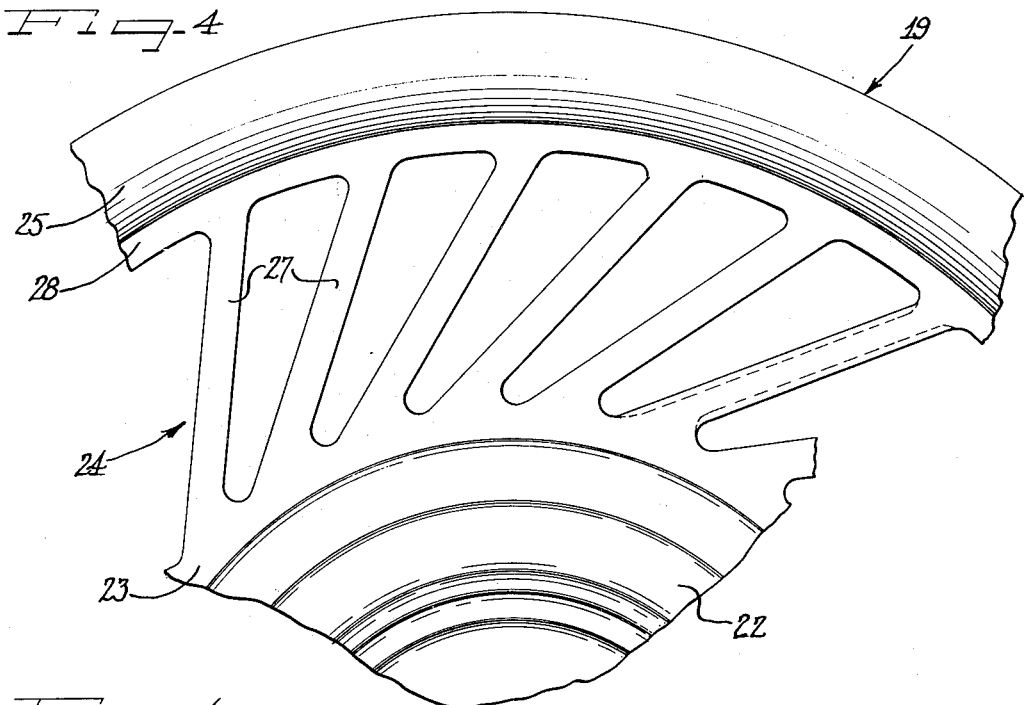
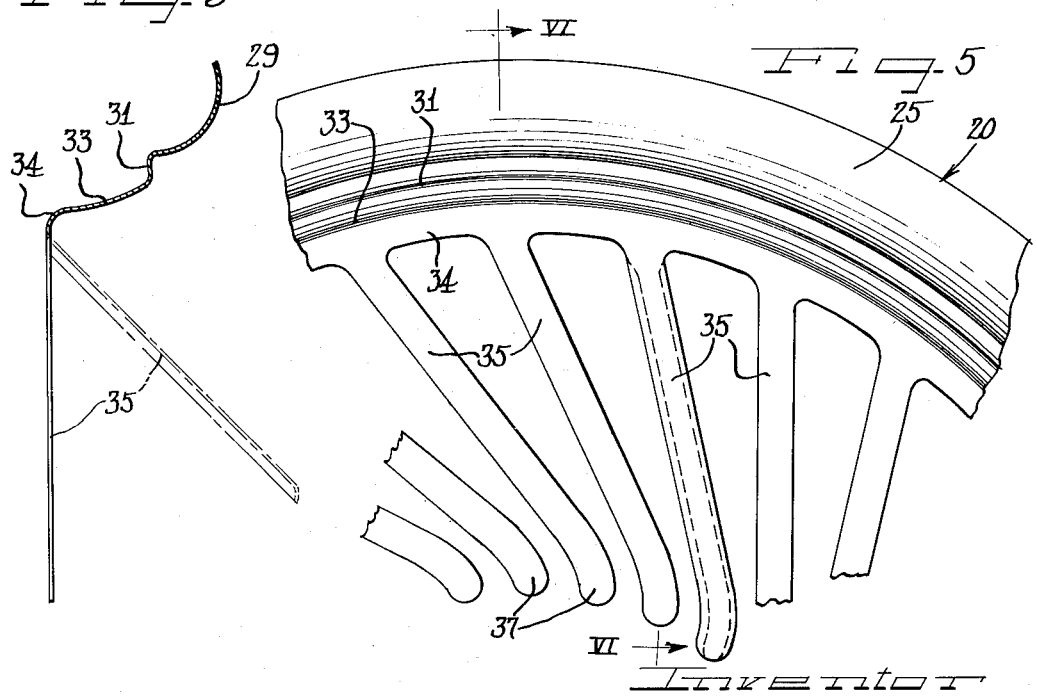
Inventor
George Albert Lyon

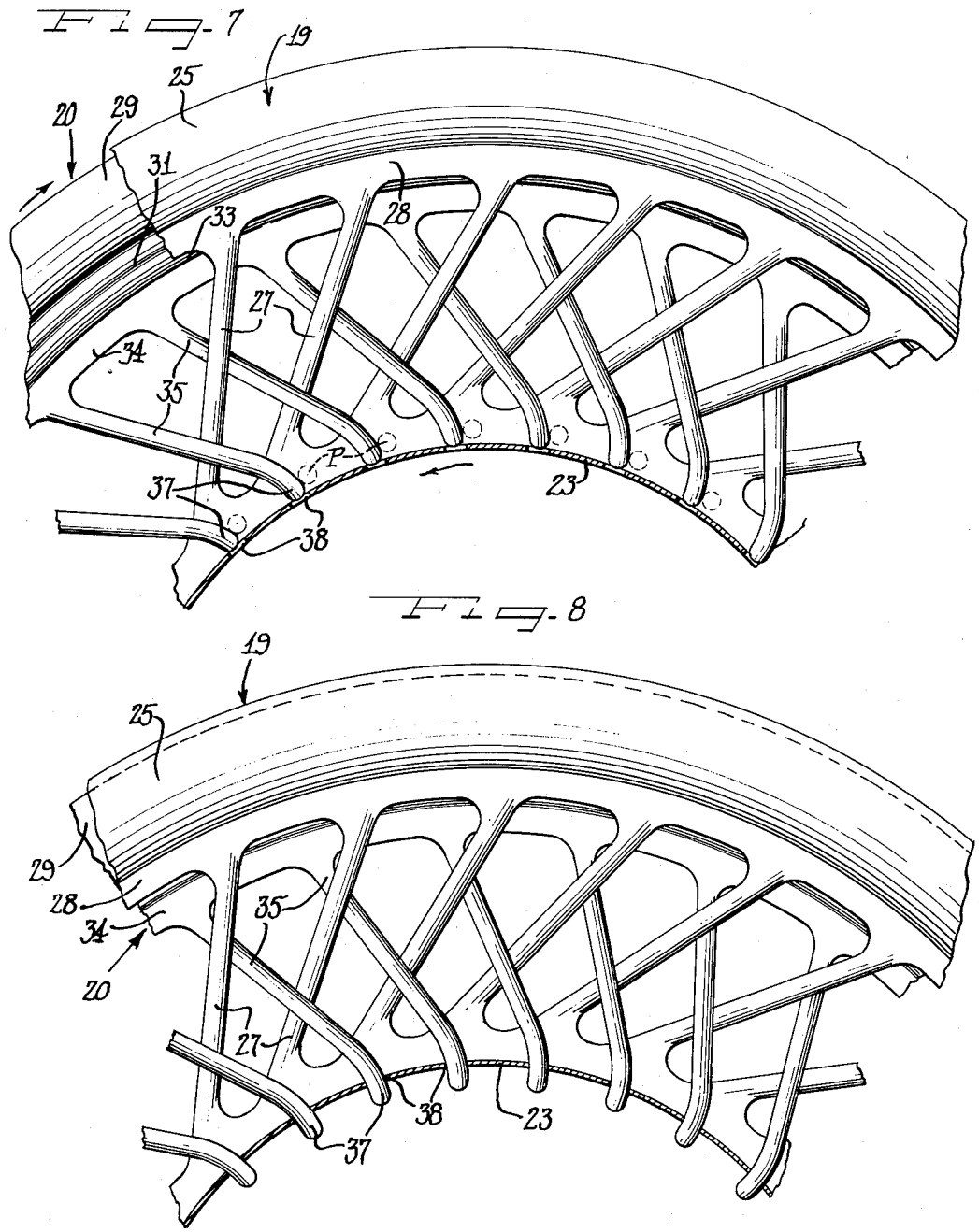

United States Patent Office 2,713,517
Patented July 19, 1955

2,713,517

WHEEL STRUCTURE AND METHOD OF MAKING SAME

George Albert Lyon, Detroit, Mich.

Application November 18, 1952, Serial No. 321,095

14 Claims. (Cl. 301—37)

The present invention relates to improvements in wheel structures and more particularly concerns the ornamental and protective covering of the outer sides of vehicle wheels.

An important object of the present invention is to provide a wheel structure having novel means on the outer side thereof simulating a wire wheel construction.

Another object of the invention is to provide a vehicle wheel of other than wire wheel type with an outer side cover which will impart to the wheel the appearance of being a wire spoke wheel.

A further object of the invention is to provide a novel cover for disposition at the outer side of a vehicle wheel.

Still another object of the invention is to provide a novel wire wheel spoke simulating type of wheel cover.

Yet another object of the invention is to provide an improved method of making a wire wheel spoke simulating composite wheel cover.

Other objects, features and advantages of the present invention will be readily apparent from the following detailed description of a preferred embodiment thereof taken in conjunction with the accompanying drawings, in which:

Figure 1 is a side elevational view of a vehicle wheel embodying features of the present invention;

Figure 2 is a sectional detail view, on an enlarged scale, taken substantially on the line II—II of Figure 1;

Figure 3 is a sectional view similar to Figure 2 but showing the cover in the process of being pried from the wheel;

Figure 4 is a fragmentary outer side elevational view of one of the cover components showing the same in a stage of production;

Figure 5 is a fragmentary side elevational view of a second component of the cover showing the same in one stage of production;

Figure 6 is a transverse sectional view taken substantially on the line VI—VI of Figure 5;

Figure 7 is a fragmentary outer side elevational view, partially in section, of the cover components of Figures 4 and 5 following additional formation of the spoke portions thereof and preliminary assembly prior to final assembly; and Figure 8 is a side elevational view similar to Figure 7, but showing the cover components in final assembled form, and may be also considered as taken substantially on the section line VIII—VIII of Figure 2.

The present invention involves the covering of the outer side of a wheel of the conventional disk spider or like type in a manner to give the illusion of being a wire spoke type of wheel. The wheel may comprise a wheel body 10 of the disk spider type having an inner dished bolt-on flange 11 and an outer marginal axially inwardly directed attachment flange 12 by which the body is attached in suitable manner and in supporting relation to a base flange 13 of a tire rim. The tire rim is of the multi-flange, drop center type having an outer side flange 14 directed generally radially and axially outwardly and merging with an intermediate flange 15 directed generally axially outwardly and sloping radially outwardly and in turn merging with a terminal flange 17. The construction of the tire rim is such as to support a pneumatic tire and tube assembly 18. Between the wheel body 10 and the tire rim is provided a substantial juncture groove which opens axially outwardly.

For disposition at the outer side of the wheel in ornamental, protective relation and to afford general simulation of the wheel being a wire spoke-type of wheel, is a wheel cover which is preferably formed from sheet metal stampings comprising an outer cover plate component 19 and an inner cover plate component 20. The cover plates 19 and 20 are secured together in assembly and the assembly is provided with retaining spring clip fingers 21 by which the cover is attached in press-on, pry-off relation to the wheel.

The outer cover component 19 comprises a disk or plate of sheet metal which may be stainless steel or brass or other suitable sheet metal which is stamped or pressed by suitable sheet metal drawing methods to provide a central crown portion 22 adapted to overlie the central portion or bolt-on flange 11 of the wheel body. The central crown portion 22 is provided with a side wall portion 23 which extends generally axially inwardly and radially outwardly and merges with an intermediate generally radially outwardly directed portion 24 joined to a radially outer annular preferably rib-like outwardly convex marginal portion 25 adapted to overlie the tire rim and more particularly the terminal flange portion 17 of the tire rim. The intermediate portion 24 is cut out at uniform intervals to provide a uniform series of spoke elements 27 which are preferably angled all in one peripheral direction, and as visualized in Figure 1 in a clockwise direction from the inner portion 23 of the cover member to the outer marginal annular portion 25, and with the adjacent spokes divergently related to one another so that at their outer ends they are spaced further apart than at their inner ends. The spoke elements 27 are preferably transversely shaped for appearance and rigidity and to afford wire spoke simulation are of semi-cylindrical or cylindrical shape. The inner part of the annular outer portion 25 extends generally axially inwardly to lie in spaced relation opposite juncture of the intermediate and terminal flanges of the tire rim and has an angularly radially inwardly directed flange portion 28 to which the outer ends of the spoke elements 27 are joined integrally in one piece.

The inner cover plate member 20 is constructed as an annulus having an outer portion 29 which is complementary to and is internested behind the outer plate cover portion 25. An outer extremity underturned reinforcing and finishing flange 30 on the cover portion 25 is utilized to secure the outer extremity of the inner cover portion 25 fixedly in assembly with the cover portion 25. An angular radially inwardly directed intermediate flange 31 on the inner cover member 20 is generally complementary to and is in abutment with the back of the outer cover member flange 28. The junctures of the flanges 28 and 31 with the respective cover portions 25 and 29 are internested and provide a double thickness, substantially rigid reinforcing rib 32 which opposes the juncture shoulder between the tire rim flanges 15 and 17 in fairly close but nevertheless substantially spaced relation.

Extending generally axially inwardly from the inner extremity of the flange 31 is an annular body portion 33 having at its inner margin a preferably concave convex annular generally radially inwardly directed flange portion 34 from which extends a uniform series of generally radially and axially outwardly oblique spoke elements 35 which are equal in number to the spoke elements 24 but are preferably of greater length and angled in crossing peripheral direction to the spoke elements 27. Spacing of the spoke elements 35 is complementary to the spacing of the spoke elements 27 and the spoke elements 35 extend from behind the cover assembly through the spaces between the spoke elements 27. The inner extremities of the spoke elements 35 are provided with radially inwardly angled tip portions 37 extending generally toward the center of the cover and assembled in suitable individual apertures 38 provided in series in an annular area of the crown side wall 23 adjacent to the crown proper 22 of the outer cover plate 19. As best seen in Figure 1, the angularity and length of the spoke elements 27 and 35 is such that each of the spoke elements 35 underlies the outer end portion of one of the spoke elements 27 and extends into overlying relation to the inner end portion of the immediately adjacent spoke element 27 in the direction of the extent of the spoke element 35. Furthermore, the arrangement is such that the outer ends of the spoke elements 35 appear to emanate from what looks from the outer side of the cover to be a tire rim inner or base flange viewed through the openings between the spoke elements 27. On the other hand, the outer end portions of the spoke elements 27 appear to be connected to the outer side of a tire rim at the annular recess provided at juncture of the flange portion 28 with the outer marginal portion 25 of the outer cover member. At the inner ends of the spoke elements, the terminals of the spoke elements 35 appear to be attached to the axially outer portion of a wheel hub while the inner ends of the spoke elements 27 appear, through the spaces between the inner terminal portions of the spoke elements 35 to emanate from an inner, greater diameter portion of the wheel hub.

It will be appreciated that a highly ornamental appearance may be imparted to the two cover portions 19 and 20 and their spoke elements by burnishing, or plating and polishing the outer exposed sheet metal surfaces of the cover members and the spoke elements.

Each of the retaining spring clip fingers 21 is completely hidden behind the cover and is carried by the radially outer side of the inner cover member body portion 33. To this end each of the retaining finger members 21 has a body flange or leg 39 of substantial length and width attached as by means of a rivet 40 to the radially outwardly facing side of the cover member body 33 which may, as shown, be of radially outwardly concave cross-sectional shape for rigidity and also to provide with the opposing portion of the tire rim a substantial space to accommodate the retaining fingers 21. From the body flange portion 39 extends a retaining finger loop 41 which is directed generally radially outwardly and then axially outwardly and terminates in an angular, short and preferably relatively stiff generally radially outwardly angled retaining terminal 42 which is engageable in retaining, gripping, biting relation against the radially inwardly facing surface of the intermediate flange 15 of the tire rim. By preference the retaining fingers 21 are made from spring steel and initially the tips of the terminals 42 extend to a greater diameter than the inside diameter of the engaged portion of the intermediate flange 15 so that when the cover is applied to the wheel by pressing the same axially inwardly the retaining finger loops 41 are placed under resilient flexure and tension which reacts against the terminals 42 to drive the same into firm retaining engagement with the intermediate flange 15. It will be observed the retaining fingers 21 support the cover in completely spaced, floating relation to the wheel. While the turned reinforcing and spoke-carrying inner flange portion 34 of the inner cover member closely approaches the side flange 14, it is in spaced relation thereto.

For removing the cover from the wheel, a pry-off tool T (Fig. 3) may be inserted behind the reinforced outer edge flange 30 and then worked by pry-off pressure toward the shoulder 32 which is then engaged and pry-off force effectively applied to release the adjacent one or more of the retaining fingers 21 from the tire rim intermediate flange 15. During this pry-off process, the spring loops 41 of the retaining fingers are adapted to back up against the axially inner portion of the cover portion body 33, and further flex as enabled in the space between the cover and the tire rim and by the resilient relief afforded by the resilient loops of the retaining fingers 21 at the opposite side of the cover responsive to the pry-off tool pressure.

The cover of the present invention is readily adapted to economical mass production manufacture. The method by which this is accomplished comprises initially drawing the outer cover plate 19 from a blank of the selected sheet metal stock to provide the completed shape of the crown portion 22 and the crown side wall 23 as well as the outer marginal portion 25, except that the outer extremity of the marginal portion 25 will not initially be turned under. The intermediate portion 24 of the cover member 19 will initially be solid but of the cross-sectional angle desired such as slightly oblique in an axially inward direction from the juncture at the crown side wall 23 to the flange 28. The cover plate 19 can now be polished or plated and polished very readily. Thereafter, the areas between the spokes 27 are trimmed out leaving the spoke elements in a flat condition. The spoke elements 27 are then shaped to the preferred cross-sectional contour such as arcuate or semi-cylindrical as indicated in dash outline in Fig. 4.

The inner cover member 20 may be formed as a stamping from a sheet metal blank or it may be rolled from a continuous strip to the preferred cross-sectional contour which is shown in Figures 5 and 6. At this time the area of the cover member 20 in which the spoke elements are formed will be flat and solid so that the member can be readily polished or plated and polished. Thereafter, the spaces are provided between the spoke elements 35 by cutting away the material between the spoke elements. The spoke elements 35 are then shaped to the preferred contour such as semicylindrical as indicated in dash outline in Fig. 5. Coincident with such shaping of the spoke elements or thereafter, the spoke elements 35 are bent from the original flat plane to the oblique plane as indicated in dash outline in Fig. 6. In the finished member 20, ready for assembly with the outer cover member 19, the spoke elements 35 are directed a somewhat greater peripheral angularity than in the finished cover in order to facilitate assembly of the cover components.

As best seen in Fig. 7, the cover components 19 and 20 are initially assembled by a generally spiral relative axial movement of the components substantially as indicated by the directional arrows to bring the spoke elements 35 into general position through the substantial spaces between the spoke elements 27 and until the tips of the spoke terminals 37 are in alignment with the assembly apertures 38 in the side wall portion 23 of the outer cover member. By this time the outer cover portions 25 and 29 will be internested. Then, by further relative torsional or rotary movement of the cover members 19 and 20, and if necessary with the assistance of assembly jig pins P (Fig. 7) the angular terminals 37 are driven into assembled relation within the apertures 38 while the bodies of the spoke elements 35 are angularly adjusted toward a somewhat less peripherally angular relation to the inner cover member 19 in order to attain greater radially inward projection in the final assembly within the apertures 38. This uniform bending of the spoke elements 35 sets the cover member 20 relative to the cover member 19 and prevents untwisting or displacement of the spoke elements 35 from the assembled relationship.

Final assembly of the cover components is effected by turning under the outer marginal flange 30 for clamping the internested cover portion 29 permanently in place.

The retaining spring fingers 21 are attached to the cover member 20 at any preferred time such as before the final assembly with the cover member 19.

Cross reference is made to my co-pending application Serial No. 323,628 filed December 2, 1952, wherein are claimed novel features of the retaining spring clips described but not claimed herein.

It will be understood that modifications and variations may be effected without departing from the scope of the novel concepts of the present invention.

I claim as my invention:

1. In a wheel structure including a wheel body and a tire rim, a cover for disposition at the outer side of the wheel comprising an outer cover plate dimensioned to substantially cover the wheel body and the tire rim and having a central crown portion and an annular outer marginal portion joined by a series of peripherally angled spoke-like elements, an annular cover member internested behind said marginal cover portion and having a body flange extending generally axially inwardly, said body flange terminating in a series of generally radially inwardly and axially outwardly extending spoke extensions extending in crossing relation through the spoke elements of said outer cover member and having the terminals thereof connected to the central crown portion of the outer cover member, said flange body portion having thereon a series of retaining spring fingers retainingly engageable with the tire rim.

2. In a wheel structure including a wheel body and a tire rim, a cover for disposition at the outer side of the wheel comprising an outer cover plate dimensioned to substantially cover the wheel body and the tire rim and having a central crown portion and an annular outer marginal portion joined by a series of peripherally angled spoke-like elements, an annular cover member internested behind said marginal cover portion and having a body flange extending generally axially inwardly, said body flange terminating in a series of generally radially inwardly and axially outwardly extending spoke extensions extending in crossing relation through the spoke elements of said outer cover member and having the terminals thereof connected to the central crown portion of the outer cover member, said flange body portion having thereon a series of retaining spring fingers retainingly engageable with the tire rim, said marginal cover portion and said internested annular cover member having an intermediate pry-off rib shoulder thereon opposing the tire rim in spaced relation.

3. In a wheel structure including a wheel body and a tire rim, a cover for disposition at the outer side of the wheel comprising an outer cover plate dimensioned to substantially cover the wheel body and the tire rim and having a central crown portion and an annular outer marginal portion joined by a series of peripherally angled spoke-like elements, an annular cover member internested behind said marginal cover portion and having a body flange extending generally axially inwardly, said body flange terminating in a series of generally radially inwardly and axially outwardly extending spoke extensions extending in crossing relation through the spoke elements of said outer cover member and having the terminals thereof connected to the central crown portion of the outer cover member, said flange body portion having thereon a series of retaining spring fingers retainingly engageable with the tire rim, said marginal cover portion and said internested annular cover member having an intermediate pry-off rib shoulder thereon opposing the tire rim in spaced relation, said marginal cover portion and the extremity of the internested inner cover member cooperating to provide a rigid pry-off edge on the cover assembly spaced radially and axially outwardly from the pry-off shoulder and arranged to lie in adjacent spaced relation to the edge of the tire rim.

4. In a cover for disposition at the outer side of a vehicle wheel, a cover plate of a size to substantially cover a body and rim of a wheel and having a central crown portion and an annular marginal portion connected together by peripherally angled spoke-like elements, an annular cover member secured behind said outer annular cover portion and having a series of spoke-like elements projecting as extensions from an inner edge extremity thereof peripherally angularly through the spaces between the spoke-like elements of the cover plate and having the ends of the spokes connected thereto, and means carried by said annular cover member for attachment of the cover to a wheel.

5. In a cover for disposition at the outer side of a vehicle wheel, a cover plate of a size to substantially cover a body and rim of a wheel and having a central crown portion and an annular marginal portion connected together by peripherally angled spoke-like elements, an annular cover member secured behind said outer annular cover portion and having a series of spoke-like elements projecting as extensions from an inner edge extremity thereof peripherally angularly through the spaces between the spoke-like elements of the cover plate and having the ends of the spokes connected thereto, and means carried by said annular cover member for attachment of the cover to a wheel, said annular portion of the cover plate and said annular cover member having internested stepped portions affording a pry-off shoulder.

6. In a cover for disposition at the outer side of a vehicle wheel, a cover member having a central cover portion and a radially outer annular marginal cover portion, said cover portions being connected by a series of spoke-like elements, an annular cover member disposed behind said annular cover portion and connected thereto and having a series of spoke-like elements projecting into engagement with the central cover portion, said annular cover portion and said annular cover member having a pry-off extremity and an intermediate pry-off shoulder formation spaced from said extremity.

7. In a method of making a composite wire wheel simulating cover, forming an outer cover plate with a central portion and an annular outer portion and a solid intermediate area, polishing the outer side of said cover plate, cutting out uniform spaced portions of the intermediate portion of said plate to leave spoke-like connecting elements, shaping said spoke-like connecting elements cross-sectionally into spoke-like contour, shaping an annular cover member, externally polishing said annular cover member and severing spaced portions of an inner area of said annular cover member to provide a series of spoke-like extensions, cross-sectionally shaping said spoke-like extensions into wire spoke simulating form, forming a series of annularly aligned apertures in said central portion of the first mentioned cover member, and assembling said annular cover member behind the outer annular portion of the first mentioned cover member and projecting the spoke-like extensions of the annular cover member through the spaces between the spoke-like connecting elements of the first mentioned cover member by relative spiral movement of the cover members and driving the terminals of said spoke-like extensions into said apertures.

8. The method of making a composite wire wheel spoke simulating cover which comprises forming an outer cover plate and an annular inner cover member from separate sheet metal blanks, cutting from an intermediate portion of said outer cover plate spaced sections to provide a spoke-like pattern of connecting elements between an inner hub portion and an annular marginal portion, severing spaced portions from an inner marginal portion of said annular cover member to provide a series of spoke extensions thereon, bending said spoke extensions into radially inwardly and axially outwardly oblique relation to the annular cover member, assembling the annular cover member behind the outer marginal portion of the outer cover member and by relative spiral movement of the cover members projecting the spoke-like extensions of the annular cover member through the openings between the connecting spoke elements of the outer cover member, and securing the terminals of said spoke extensions to the inner portion of the outer cover member.

9. In a method of making a spoke wheel simulating cover assembly, shaping a cover plate to provide a central hub portion and an annular marginal portion, severing spaced areas of an intermediate portion of the cover plate to provide peripherally angled spoke-like connecting elements, forming an annular series of openings in a radially outwardly facing portion of said inner hub portion, shaping an annular cover member dimensioned to interfit with said annular marginal portion of the cover plate, and assembling the cover plate and the annular cover member by relatively torsionally moving the cover plate and annular cover member into assembled relation and projecting the spoke extensions of the annular cover member through the openings between the spoke connecting elements of the cover plate until the terminals of the spoke extensions project into the apertures.

10. The method of assembling a cover plate having an intermediate portion thereof cut out to provide connecting spokes angled in one peripheral direction and having an inner annular portion thereof facing generally radially outwardly and provided with spoke-receiving apertures with an annular cover member internestable behind the outer marginal portion of the cover plate and having radially inwardly and axially outwardly directed spoke extensions angled in the opposite peripheral direction from said connecting spoke elements, which comprises extending the spoke extensions of the annular cover member through the openings between the spoke connecting elements of the cover plate, relatively turning the cover plate and annular cover member until the tips of the spoke extensions are aligned with said apertures, and engaging the terminal portions of the spoke extensions in said apertures and further relatively turning the annular cover member and the cover plate and bending and setting the spoke extensions to lesser peripheral angularity relative to the annular cover member than the initial angularity of the spoke extensions to resist withdrawal of the spoke extensions from said apertures, and permanently securing the annular cover member to said annular marginal portion of the cover plate.

11. The method of making a cover for disposition at the outer side of a vehicle wheel which comprises forming a sheet metal blank into an angular portion and a flat portion, polishing the outer side of the angular and flat portions, severing spaced sections of said flat portion to provide a series of spoke-like extensions, and bending the spoke-like extensions into angular oblique relation to said angular portion.

12. The method of making a cover for disposition at the outer side of a vehicle wheel which comprises forming a sheet metal blank into an angular portion and a flat portion, polishing the outer side of the angular and flat portions, severing spaced sections of said flat portion to provide a series of spoke-like extensions, bending the spoke-like extensions into angular oblique relation to said angular portion, and assembling the cover member with a second cover member having an intermediate portion severed in spaced sections thereof to provide spoke elements by inserting the oblique spoke extensions through said openings and into endwise engagement with a part of the second cover member.

13. In a cover for disposition at the outer side of a vehicle wheel, a cover member having a central portion provided with a flange facing generally radially outwardly and provided with an annular series of apertures, and a circular cover member of substantially larger diameter than said flange disposed concentrically relative thereto and having a series of spoke extensions thereon directed generally peripherally and toward said flange and having terminal portions angled from the extensions generally toward the center of the cover and extending into said apertures.

14. In combination in a cover for disposition at the outer side of a vehicle wheel, a cover member having a central portion providing a generally radially outwardly facing annular surface having therein a series of annularly aligned apertures, said cover member having an annular marginal portion spaced from said central portion and connected thereto by a series of spaced spoke elements angled in one peripheral direction, an annular cover member internested with said annular marginal cover portion and having a flange body portion extending generally axially inwardly behind the outer cover member, said body flange portion having an inner extremity provided with a series of spoke-like extensions generally matching the spoke-like elements of the outer cover member and extending through the spaces between said spoke-like elements and having terminals engaged retainingly in said apertures, said terminals being angled from the axes of the respective extensions toward the center of the cover to facilitate engagement thereof in said apertures.

References Cited in the file of this patent
UNITED STATES PATENTS 2,163,005     Lyon _____ June 20, 1939